US012056087B2

(12) United States Patent
Bao

(10) Patent No.: US 12,056,087 B2
(45) Date of Patent: Aug. 6, 2024

(54) DATA TRANSMISSION METHOD, ELECTRONIC DEVICE, AND COMPUTER-READABLE STORAGE MEDIUM

(71) Applicant: Huawei Technologies Co., Ltd., Shenzhen (CN)

(72) Inventor: Daxiang Bao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/255,020

(22) PCT Filed: Nov. 29, 2021

(86) PCT No.: PCT/CN2021/134090
§ 371 (c)(1),
(2) Date: May 30, 2023

(87) PCT Pub. No.: WO2022/111699
PCT Pub. Date: Jun. 2, 2022

(65) Prior Publication Data
US 2024/0095210 A1   Mar. 21, 2024

(30) Foreign Application Priority Data
Nov. 30, 2020 (CN) .......................... 202011379409.0

(51) Int. Cl.
*G06F 16/11* (2019.01)
*G06F 16/14* (2019.01)
(52) U.S. Cl.
CPC .......... *G06F 16/122* (2019.01); *G06F 16/156* (2019.01)

(58) Field of Classification Search
CPC ............................ G06F 16/122; G06F 16/156
See application file for complete search history.

(56) References Cited

U.S. PATENT DOCUMENTS

| | | | | |
|---|---|---|---|---|
| 8,285,850 B1 * | 10/2012 | Jones | ...................... | H04L 47/22 709/227 |
| 9,727,751 B2 * | 8/2017 | Oliver | ................... | H04L 63/102 |
| 2007/0050368 A1 * | 3/2007 | Watanabe | ........... | G06F 21/6218 707/999.009 |
| 2007/0186100 A1 * | 8/2007 | Wakameda | ............. | H04L 69/22 713/160 |
| 2015/0356078 A1 | 12/2015 | Kishimoto et al. | | |
| 2017/0109053 A1 | 4/2017 | Bromley et al. | | |

FOREIGN PATENT DOCUMENTS

| | | | | | |
|---|---|---|---|---|---|
| CN | 103795490 | A | * | 5/2014 | |
| CN | 107704633 | A | * | 2/2018 | ............ G06F 16/119 |
| CN | 108322479 | A | * | 7/2018 | ............ H04L 67/06 |

* cited by examiner

*Primary Examiner* — Kuen S Lu
(74) *Attorney, Agent, or Firm* — Conley Rose, P.C.

(57) ABSTRACT

A method includes searching, in response to a received policy query request, a preset policy library for a transmission policy that matches the policy query request, wherein the policy query request comprises hardware information of a transmitting end, hardware information of a receiving end, and data information of to-be-transmitted data in the transmitting end, and wherein the data information comprises a total data volume of the to-be-transmitted data, a data category comprised in the to-be-transmitted data, and a data volume of each data category, and feeding back a query result of the policy query request to the transmitting end.

20 Claims, 7 Drawing Sheets

DATA TRANSMISSION METHOD, ELECTRONIC DEVICE, AND COMPUTER-READABLE STORAGE MEDIUM

CROSS-REFERENCE TO RELATED APPLICATIONS

This application is a national stage of International Application No. PCT/CN2021/134090, filed Nov. 29, 2021, which claims priority to Chinese Patent Application No. 202011379409.0, filed on Nov. 30, 2020. Both of the aforementioned applications are hereby incorporated by reference in their entireties.

TECHNICAL FIELD

This application relates to the field of terminal technologies, and in particular, to a data transmission method, an electronic device, and a computer-readable storage medium.

BACKGROUND

Currently, users change electronic devices frequently, and most users choose to migrate data in an old electronic device to a newly purchased electronic device during electronic device changing. With increase of storage space of electronic devices, electronic devices of many users now store data of more than dozens of gigabytes, or even hundreds of gigabytes. How to quickly complete data migration is an important part of electronic device change experience of the users.

For example, in a process in which a user changes a mobile phone, migration of data categories such as SMS, contacts, memos, pictures, videos, music, documents, and application data are involved. In an existing mobile phone data migration policy, each type of data is generally sent based on a preset transmission sequence. However, different mobile phones have different performance, and data categories and data volumes that need to be migrated may also be different. Using a migration policy of a fixed transmission sequence cannot enable all mobile phones to achieve an optimal speed during mobile phone changing, and cannot bring good mobile phone change experience to the user.

SUMMARY

In view of this, it is necessary to provide a data transmission method, which can overcome the foregoing problem, so that an electronic device can flexibly use a data transmission policy suitable for the electronic device, thereby improving data migration efficiency and electronic device change experience of a user.

A first aspect of embodiments of this application discloses a data transmission method, including: in response to a received policy query request, searching a preset policy library for a transmission policy that matches the policy query request, where the policy query request includes hardware information of a transmitting end, hardware information of a receiving end, and data information of to-be-transmitted data in the transmitting end, and the data information includes a total data volume of the to-be-transmitted data, a data category included in the to-be-transmitted data, and a data volume of each data category; and feeding back a query result of the policy query request to the transmitting end.

By using this technical solution, a transmission policy suitable for a current transmission situation can be matched based on the hardware information of the transmitting end, the hardware information of the receiving end, and the data information of the to-be-transmitted data in the transmitting end, thereby improving data migration efficiency and improving device change experience of a user.

In a possible implementation, the feeding back a query result of the policy query request to the transmitting end includes: if a transmission policy that matches the policy query request is obtained through searching in the preset policy library, feeding back the transmission policy obtained through searching to the transmitting end; or if no transmission policy that matches the policy query request is obtained through searching in the preset policy library, feeding back search result information indicating that matching is null to the transmitting end.

By using this technical solution, when the transmission policy that matches the policy query request is obtained through searching in the preset policy library, the matched transmission policy may be used for data transmission, thereby improving the data migration efficiency. When no transmission policy that matches the policy query request is obtained through searching in the preset policy library, a default transmission policy is used for data transmission, thereby ensuring that data migration is successfully completed.

In a possible implementation, the method further includes: when transmission information fed back for the transmission policy sent to the transmitting end is received, updating the transmission policy by using the transmission information, where the transmission information includes at least an average transmission speed.

By using this technical solution, information about a transmission policy in the preset policy library may be updated with reference to an actual data transmission result, to optimize the preset policy library.

In a possible implementation, the searching a preset policy library for a transmission policy that matches the policy query request includes:
  searching the preset policy library for a first transmission policy that matches the hardware information of the transmitting end and the hardware information of the receiving end;
  if a plurality of first transmission policies are obtained through searching, searching the plurality of first transmission policies for a second transmission policy of which a data category is the same as that included in the to-be-transmitted data; and
  if a plurality of second transmission policies are obtained through searching, searching the plurality of second transmission policies for a third transmission policy of which a total data volume and that of the to-be-transmitted data have a difference within a preset difference range.

By using this technical solution, the preset policy library can be searched for the transmission policy that matches the policy query request, thereby improving the data migration efficiency.

In a possible implementation, the searching a preset policy library for a transmission policy that matches the policy query request includes:
  searching the preset policy library for a first transmission policy that matches the hardware information of the transmitting end and the hardware information of the receiving end;

if a plurality of first transmission policies are obtained through searching, searching the plurality of first transmission policies for a second transmission policy of which a total data volume and that of the to-be-transmitted data have a difference within a preset difference range; and if a plurality of second transmission policies are obtained through searching, searching the plurality of second transmission policies for a third transmission policy of which a data category is the same as that included in the to-be-transmitted data.

By using this technical solution, the preset policy library can be searched for the transmission policy that matches the policy query request, thereby improving the data migration efficiency.

In a possible implementation, the searching a preset policy library for a transmission policy that matches the policy query request further includes:

if a plurality of third transmission policies are obtained through searching, selecting, from the plurality of third transmission policies as the transmission policy that matches the policy search request, a transmission policy of which each data category has a minimum comprehensive difference with each data category of the to-be-transmitted data.

By using this technical solution, the preset policy library can be searched for the transmission policy that matches the policy query request, thereby improving the data migration efficiency.

In a possible implementation, the method further includes: if no first transmission policy that matches the hardware information of the transmitting end and the hardware information of the receiving end exists in the preset policy library, feeding back search result information indicating that matching is null to the transmitting end.

By using this technical solution, when the transmission policy matching the policy query request is not obtained through searching in the preset policy library, the transmitting end can be notified, so that the transmitting end can perform data transmission by using the default transmission policy, thereby ensuring that data migration is successfully completed.

In a possible implementation, the method further includes: the searching the preset policy library for a first transmission policy that matches the hardware information of the transmitting end and the hardware information of the receiving end includes: searching the preset policy library for the first transmission policy that has a same device model, a same memory size, and a same storage capacity as those of the transmitting end and the receiving end; or searching the preset policy library for the first transmission policy that has a same CPU model, a same memory size, and a same storage capacity as those of the transmitting end and the receiving end.

By using this technical solution, when device models, memory sizes, and storage capacities are the same, it may be considered that the hardware information of the transmitting end matches the hardware information of the receiving end; or when CPU models, memory sizes, and storage capacities are the same, it may also be considered that the hardware information of the transmitting end matches the hardware information of the receiving end.

In a possible implementation, the method further includes: if a quantity of first transmission policies obtained through searching is one, using the first transmission policy as the transmission policy that matches the policy search request; or if a quantity of second transmission policies obtained through searching is one, using the second transmission policy as the transmission policy that matches the policy search request.

By using this technical solution, the preset policy library can be searched for the transmission policy that matches the policy query request, thereby improving the data migration efficiency.

In a possible implementation, if no second transmission policy of which a data category is the same as that included in the to-be-transmitted data is obtained through searching in the plurality of first transmission policies, selecting a transmission policy with a maximum average transmission speed from the plurality of first transmission policies as the transmission policy that matches the policy search request; or if no third transmission policy of which a total data volume and that of the to-be-transmitted data have a difference within the preset difference range is obtained through searching in the plurality of second transmission policies, selecting, from the plurality of second transmission policies as the transmission policy that matches the policy search request, a transmission policy of which a total data volume and that of the to-be-transmitted data have a minimum difference.

By using this technical solution, the preset policy library can be searched for the transmission policy that matches the policy query request, thereby improving the data migration efficiency.

In a possible implementation, the method further includes: if no second transmission policy of which a total data volume and that of the to-be-transmitted data have a difference within the preset difference range is obtained through searching in the plurality of first transmission policies, selecting, from the plurality of first transmission policies as the transmission policy that matches the policy search request, a transmission policy of which a total data volume and that of the to-be-transmitted data have a minimum difference; or if no third transmission policy of which a data category is the same as that included in the to-be-transmitted data is obtained through searching in the plurality of second transmission policies, selecting a transmission policy with a maximum average transmission speed from the plurality of second transmission policies as the transmission policy that matches the policy search request.

By using this technical solution, the preset policy library can be searched for the transmission policy that matches the policy query request, thereby improving the data migration efficiency.

In a possible implementation, the to-be-transmitted data includes i data categories, i is a natural number greater than or equal to 1, and before the selecting, from the plurality of third transmission policies, a transmission policy of which each data category has a minimum comprehensive difference with each data category of the to-be-transmitted data, the method further includes: sequentially calculating a comprehensive difference between each data category of each third transmission policy and each data category of the to-be-transmitted data based on a preset deviation calculation formula, where the preset deviation calculation formula is $V=\mathrm{Sum}(p_i*|f_i-f_i'|)$, where V is the comprehensive difference, $p_i$ is a weight of an $i^{th}$ data category, $f_i$ is a data volume of the $i^{th}$ data category of the to-be-transmitted data, $f_i'$ is a data volume of the $i^{th}$ data category corresponding to the third transmission policy, and $|f_i-f_i'|$ is an absolute value of a difference between $f_i$ and $f_i'$.

By using this technical solution, the preset policy library can be searched for the transmission policy that matches the policy query request, thereby improving the data migration efficiency.

A second aspect of embodiments of this application discloses a data transmission method, including: when a transmitting end and a receiving end meet a transmission condition, obtaining hardware information of the transmitting end, hardware information of the receiving end, and data information of to-be-transmitted data in the transmitting end, where the data information includes a total data volume of the to-be-transmitted data, a data category included in the to-be-transmitted data, and a data volume of each data category; sending a policy search request to a query end, where the policy search request includes the hardware information of the transmitting end, the hardware information of the receiving end, and the data information of the to-be-transmitted data in the transmitting end, and the query end is disposed in the transmitting end or a server; and receiving a search result fed back by the query end for the policy search request, to determine a transmission manner of the to-be-transmitted data based on the query result.

By using this technical solution, a transmission policy suitable for a current transmission situation can be matched from the query end based on the hardware information of the transmitting end, the hardware information of the receiving end, and the data information of the to-be-transmitted data in the transmitting end, thereby improving data migration efficiency and improving device change experience of a user.

In a possible implementation, the determining the transmission manner of the to-be-transmitted data based on the query result includes: if the search result is that the query end finds a transmission policy that matches the policy search request, transmitting the to-be-transmitted data by using the transmission policy obtained through searching by the query end; or if the search result is information indicating that matching is null, transmitting the to-be-transmitted data by using a default transmission policy.

By using this technical solution, when the query end finds the transmission policy that matches the policy query request, the matched transmission policy may be used for data transmission, thereby improving data migration efficiency; and when the query end fails to find the transmission policy that matches the policy query request, the default transmission policy is used for data transmission, thereby ensuring that data migration is successfully completed.

In a possible implementation, the method further includes: feeding back, to the query end, transmission information of transmitting the to-be-transmitted data by using the transmission policy obtained through searching by the query end, where the transmission information includes at least an average transmission speed.

By using this technical solution, the information about the transmission policy stored in the query end may be updated with reference to an actual data transmission result, to optimize the transmission policy stored in the query end.

In a possible implementation, the method further includes: performing, according to a preset echelon division rule, transmission echelon division on the data category included in the to-be-transmitted data; and if the data category included in the to-be-transmitted data is classified into a same transmission echelon, transmitting the to-be-transmitted data by using a default transmission policy; or if the data category included in the to-be-transmitted data is classified into two or more transmission echelons, sending the policy search request to the query end.

By using this technical solution, when the data category included in the to-be-transmitted data belongs to only one transmission echelon, the transmission policy does not need to be obtained from the query end, and the default transmission policy is directly used for data transmission. When the data category included in the to-be-transmitted data belongs to two or more transmission echelons, a policy search request is initiated to the query end, to match the transmission policy suitable for the current transmission situation.

In a possible implementation, the preset echelon division rule includes: classifying a data category that does not need data preparation into a first transmission echelon; classifying a data category for which data preparation is performed in a first manner into a second transmission echelon; and classifying a data category for which data preparation is performed in a second manner into a third transmission echelon, where the first manner is different from the second manner.

By using this technical solution, transmission echelon division is performed on the data category included in to-be-transmitted data.

In a possible implementation, the default transmission policy includes: performing data transmission sequentially based on a sequence of the first transmission echelon, the second transmission echelon, and the third transmission echelon; and in the first transmission echelon, or in the second transmission echelon, or in the third transmission echelon, performing data transmission sequentially in a descending order or an ascending order based on a data volume of each data category.

By using this technical solution, when the default transmission policy is used for data transmission, transmission is sequentially performed based on a transmission echelon sequence. For each data category in the transmission echelon, transmission is sequentially performed based on a data volume.

According to a third aspect, an embodiment of this application provides a computer-readable storage medium, including computer instructions. When the computer instructions are run on an electronic device, the electronic device performs the data transmission method according to the first aspect or the second aspect.

According to a fourth aspect, an embodiment of this application provides an electronic device, where the electronic device includes a processor and a memory; the memory is configured to store instructions; and the processor is configured to invoke the instructions in the memory, so that the electronic device performs the data transmission method according to the first aspect or the second aspect.

According to a fifth aspect, an embodiment of this application provides a computer program product. When the computer program product is run on a computer, the computer performs the data transmission method according to the first aspect or the second aspect.

According to a sixth aspect, an embodiment of this application provides an apparatus. The apparatus has a function of implementing behavior of a first electronic device in the method provided in the first aspect or the second aspect. The function may be implemented by hardware, or may be implemented by executing corresponding software by hardware. The hardware or software includes one or more modules corresponding to the foregoing functions.

It may be understood that the computer-readable storage medium according to the third aspect, the electronic device according to the fourth aspect, the computer program product according to the fifth aspect, and the apparatus according to the sixth aspect all correspond to the method according to the first aspect or the second aspect. Therefore, for beneficial effects that can be achieved by the computer-readable storage medium according to the third aspect, the electronic device according to the fourth aspect, the computer program product according to the fifth aspect, and the apparatus according to the sixth aspect, refer to beneficial effects in the corresponding method provided above. Details are not described herein again.

DESCRIPTION OF EMBODIMENTS

It should be noted that, in this application. "at least one" means one or more, and "a plurality of" means two or more. "And/or" describes an association relationship for describing associated objects and represents that three relationships may exist. For example, A and/or B may represent the following cases: Only A exists, both A and B exist, and only B exists, where A and B may be singular or plural. In the specification, claims, and accompanying drawings of this application, the terms "first", "second", "third", "fourth", and so on (if existent) are intended to distinguish between similar objects but do not indicate a specific order or sequence.

For ease of understanding, descriptions of some concepts related to embodiments of this application are provided as examples for reference, as shown in the following.

Figure 1:
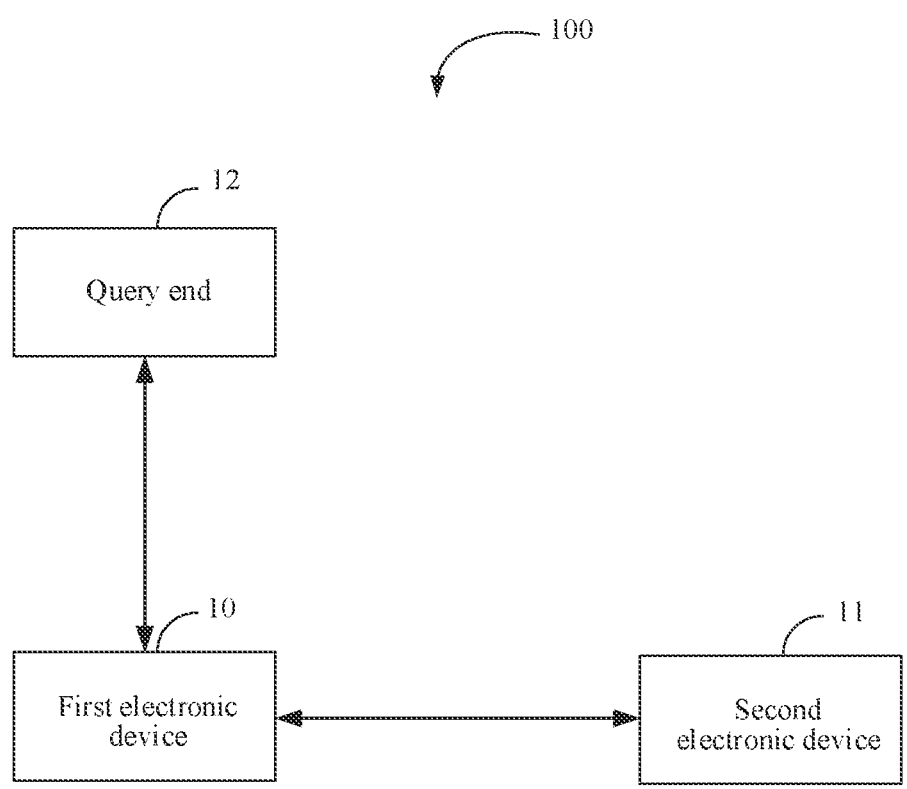
FIG. 1 is a schematic diagram of an architecture of a data transmission system according to an embodiment of this application.

With reference to FIG. 1, the following describes an example of a schematic diagram of an architecture of a data transmission system according to an embodiment of the present invention.

The data transmission system 100 may include a first electronic device 10, a second electronic device 11, and a query end 12. The first electronic device 10 and the second electronic device 11 may be consumer electronic products such as a mobile phone or a tablet computer. For ease of description of data transmission between a plurality of devices, the following assumes that the first electronic device 10 is an initiator of data migration, the second electronic device 11 is a receiving end of data migration, and data stored in the first electronic device 10 may be migrated to the second electronic device 11 by using a wireless network or a wired network.

In some embodiments, data stored in the first electronic device 10 may be classified into a plurality of data categories. For example, the data stored in the first electronic device 10 is classified into 11 data categories. A first data category corresponds to SMS message data, a second data category corresponds to contact data, a third data category corresponds to call record data, a fourth data category corresponds to memo data, a fifth data category corresponds to picture data, a sixth data category corresponds to video data, a seventh data category corresponds to music data, an eighth data category corresponds to recording data, a ninth data category corresponds to document data, a tenth data category corresponds to application (Application, APP) data, and an eleventh data category corresponds to system setting data.

In some embodiments, the query end 12 may be disposed in the first electronic device 10, or may be disposed in another device, for example, a server. The query end 12 may be an application, a plug-in, or a software and hardware function module that has a policy search request function. If the query end 12 is disposed in the first electronic device 10, a preset policy library may also be stored in the first electronic device 10. If the query end 12 is disposed in the server, the preset policy library may alternatively be stored in the server. The preset policy library includes a plurality of transmission policies, and each transmission policy may define a transmission sequence of a plurality of data categories. For example, the preset policy library includes transmission policies $M_1$ to $M_n$, where n is a positive integer greater than 1. The transmission policy $M_1$ defines hardware information of a transmitting end $P_1$ (for example, the first electronic device 10), hardware information of a receiving end $Q_1$ (for example, the second electronic device 11), a data category of to-be-transmitted data of the transmitting end $P_1$, a total data volume of to-be-transmitted data and a data volume of each data category that are of the transmitting end $P_1$, the transmission policy $M_n$ defines hardware information of a transmitting end $P_n$, hardware information of a receiving end $Q_n$, a data category of to-be-transmitted data of the transmitting end $P_n$, a total data volume of the to-be-transmitted data and a data volume of each data category that are of the transmitting end PK.

In some embodiments, when the query end 12 is disposed in the first electronic device 10, the first electronic device 10 locally updates the preset policy library in real time or periodically. Therefore, when the first electronic device 10 and the second electronic device 11 meet a transmission condition, the query end 12 finds, from the preset policy library locally stored in the first electronic device 10, a transmission policy that matches a current transmission situation, to implement query of the transmission policy without relying on a network. When the query end 12 is disposed in the server, the server locally updates the preset policy library in real time or periodically. The first electronic device 10 may send the policy search request to the server, and the query end 12 disposed in the server responds to the policy search request and feeds back a search result to the first electronic device 10.

In some embodiments, the preset policy library may be constructed in the following manner: When data of the first electronic device 10 is migrated to the second electronic device 11, a total data volume of to-be-transmitted data in the first electronic device 10, a data category of the to-be-transmitted data, and a data volume of each data category are recorded, a sending sequence of the data category of the first electronic device 10 is arranged and combined to obtain a plurality of groups of transmission policies, and an average transmission speed and transmission time consumption of each group of transmission policy are recorded. It may be understood that, by using this manner, average transmission speeds and transmission time consumption of data migration performed by electronic devices of a plurality of models under different transmission policies may be recorded.

When the first electronic device 10 and the second electronic device 11 meet the transmission condition, the first electronic device 10 may communicate with the query end 12, to find, from the preset policy library, the transmission policy that matches the current transmission situation. The transmission condition may be a condition under which the first electronic device 10 starts to perform data transmission after a communication connection is established by the first electronic device 10 to the second electronic device 11. For example, an application (APP) that can trigger the transmission condition may be installed on the first electronic device 10. In a use process, a specified interface of the APP may be entered, and an icon corresponding to the transmission condition is tapped on the specified interface, to trigger the first electronic device 10 to start to perform data migration. In another embodiment, the to-be-transmitted data may alternatively be directly selected from the first electronic device 10, a corresponding sending option pops up by touching a preset operation, for example, a touch and hold operation, and data migration is triggered after a user selects a corresponding option. Further, to-be-transmitted data that meets a condition may be further searched for in the first electronic device 10 based on a voice instruction, to trigger data migration.

The current transmission situation may include hardware information of the first electronic device 10, hardware information of the second electronic device 11, and data information of to-be-transmitted data in the first electronic device 10. The hardware information may include parameters such as a device model, a central processing unit (CPU) model, a memory size, and a storage capacity. The data information of the to-be-transmitted data may include a data category of the to-be-transmitted data, a total data volume of the to-be-transmitted data, and a data volume of each data category. When the first electronic device 10 and the second electronic device 11 meet the transmission condition, the first electronic device 10 may send the policy search request to the query end 12, and the query end 12 finds, according to a preset search rule, a transmission policy that matches the current transmission situation from the preset policy library, and feeds back the transmission policy obtained through searching to the first electronic device 10. The first electronic device 10 may migrate the to-be-transmitted data to the second electronic device 11 based on the transmission policy received from the query end 12.

In some embodiments, when there is no transmission policy that matches the current transmission situation in the preset policy library, for example, the query end 12 returns search result information indicating that matching is null to the first electronic device 10, the first electronic device 10 migrates the to-be-transmitted data to the second electronic device 11 by using a default transmission policy.

In some embodiments, when the first electronic device 10 performs data migration by using the default transmission policy, a sending sequence of each data category in the default transmission policy may be set based on a data volume. To implement faster data transmission, the default transmission policy is generally formulated based on the following two points: a. A data transmission channel is kept preferentially sending a data category with a large amount of data; b. A sending sequence is weighed based on preparation time of each data category.

For example, a data category that does not require extra time to prepare is classified into a first transmission echelon, where the first transmission echelon may include picture data, video data, document data, music data, and recording data; a data category that requires extra time to prepare in a first manner (for example, querying data from a database and saving the data locally) is classified into a second transmission echelon, where the second transmission echelon may include APP data; and a data category that requires extra time to prepare in a second manner (for example, querying data from a memory and saving the data locally) is classified into a third transmission echelon, where the third transmission echelon may include SMS message data, contact data, memo data, call record data, and system setting data. When data transmission is performed by using this default transmission policy, sending is performed sequentially based on a sequence of the first transmission echelon, the second transmission echelon, and the third transmission echelon. For each transmission echelon, each data category in the transmission echelon may be sequentially sent in a descending order based on a data volume of the data category (if the data volume is same, random sending may be performed). For each data category, it may also be set that a file (for example, each picture or each video) in the data category is sequentially sent in a descending order based on a data volume, or may be sequentially sent in an ascending order, or may be sent randomly.

It may be understood that the default transmission policy is not fixed, and is related to a data category of the current to-be-transmitted data and a data volume of each data category.

Figure 2:
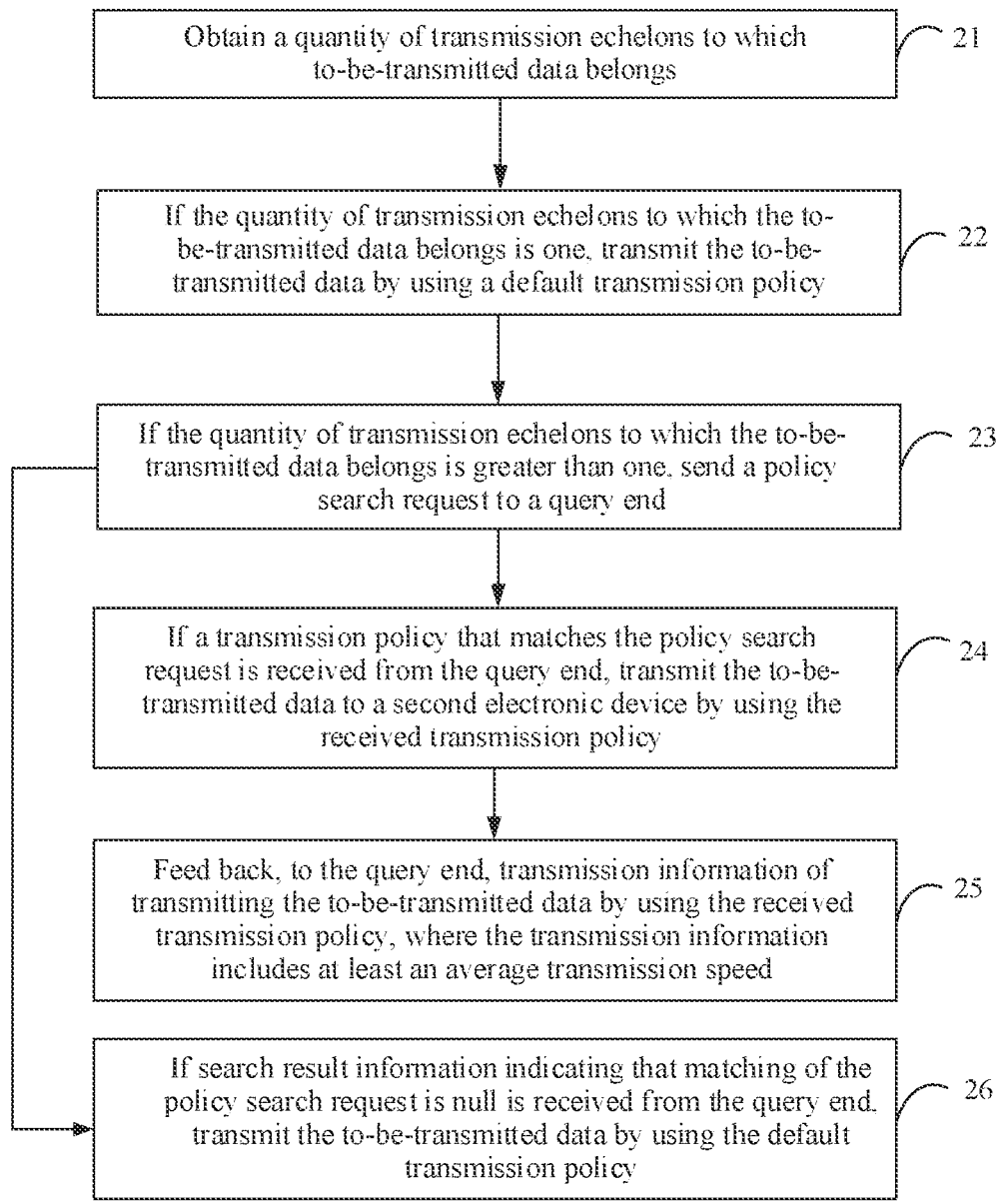
FIG. 2 is a schematic flowchart of a data transmission method according to an embodiment of this application.

Refer to FIG. 2. A data transmission method provided in an embodiment of this application is applied to a first electronic device 10, to back up to-be-transmitted data in the first electronic device 10 to a second electronic device 11. In this embodiment, the data transmission method includes the following steps.

21: Obtain a quantity of transmission echelons to which to-be-transmitted data belongs.

In some embodiments, to-be-transmitted data in the first electronic device 10 is classified into one or more data categories in 11 data categories, that is, the to-be-transmitted data in the first electronic device 10 may be summarized into one or more transmission echelons in a first transmission echelon, a second transmission echelon, and a third transmission echelon. For example, the to-be-transmitted data includes only picture data and video data, and both the picture data and the video data belong to the first transmission echelon, that is, a quantity of transmission echelons to which the to-be-transmitted data belongs is one. For another example, the to-be-transmitted data includes only picture data, video data, and APP data, both the picture data and the video data belong to the first transmission echelon, and the APP data belongs to the second transmission echelon, that is, a quantity of transmission echelons to which the to-be-transmitted data belongs is two. For another example, the to-be-transmitted data includes only picture data, APP data, and contact data, the picture data belongs to the first transmission echelon, the APP data belongs to the second transmission echelon, and the contact data belongs to the third transmission echelon, that is, a quantity of transmission echelons to which the to-be-transmitted data belongs is three.

22: If the quantity of transmission echelons to which the to-be-transmitted data belongs is one, transmit the to-be-transmitted data by using a default transmission policy.

In some embodiments, if the quantity of transmission echelons to which the to-be-transmitted data belongs is one, the first electronic device 10 does not need to obtain, from a preset policy library, a transmission policy that matches the to-be-transmitted data, and directly transmit the to-be-transmitted data by using the default transmission policy. For example, the to-be-transmitted data includes only data of the first transmission echelon, and is sequentially sent in a descending order based on a data volume of each data category. It is assumed that the to-be-transmitted data includes 800 MB picture data, 1 GB video data, and 100 MB document data, and the default transmission policy is that the 1 GB video data is transmitted first, then the 800 MB picture data is transmitted, and finally the 100 MB document data is transmitted. For another example, the to-be-transmitted data includes only data in the second transmission echelon, that is, the to-be-transmitted data is the APP data, and may be sent in a descending order based on a data volume of each APP. Assuming that the to-be-transmitted data includes 100 MB first APP data, 80 MB second APP data, and 500 MB third APP data, the default transmission policy is that the 500 MB third APP data is first transmitted, then the 100 MB first APP data is transmitted, and finally the 80 MB second APP data is transmitted.

23: If the quantity of transmission echelons to which the to-be-transmitted data belongs is greater than one, send a policy search request to a query end 12.

In some embodiments, if the quantity of transmission echelons to which the to-be-transmitted data belongs is greater than one, the first electronic device 10 sends the policy search request to the query end 12, so that the query end 12 may search, according to a preset search rule, the preset policy library for a transmission policy that matches the policy search request. The policy search request may include hardware information of the first electronic device 10, hardware information of the second electronic device 11, a total data volume of the to-be-transmitted data, the data category included in the to-be-transmitted data, and a data volume of each data category.

For example, the transmission echelon to which the to-be-transmitted data belongs includes the first transmission echelon and the second transmission echelon, and the first electronic device 10 sends the policy search request to the query end 12, to perform transmission policy searching.

24: If the transmission policy that matches the policy search request is received from the query end 12, transmit the to-be-transmitted data to the second electronic device 11 by using the received transmission policy.

In some embodiments, when the query end 12 finds the transmission policy that matches the policy search request, the query end 12 feeds back the transmission policy obtained through searching to the first electronic device 10, so that the first electronic device 10 may receive the transmission policy obtained through searching by the query end 12. When receiving the transmission policy from the query end 12, the first electronic device 10 migrates the to-be-transmitted data to the second electronic device 11 by using the received transmission policy.

25: Feed back, to the query end 12, transmission information of transmitting the to-be-transmitted data by using the received transmission policy, where the transmission information includes at least an average transmission speed.

In some embodiments, when transmitting the to-be-transmitted data by using the received transmission policy, the first electronic device 10 may collect statistics on the transmission information in a data transmission process, and feed back the transmission information to the query end 12, so that the query end 12 may update the transmission policy based on the transmission information. The transmission information may include the average transmission speed, or the average transmission speed and a transmission time consumed.

For example, each transmission policy in the preset policy library further records a corresponding average transmission speed. The query end 12 determines that a transmission policy $M_1$ is a transmission policy that matches the policy search request, and the query end 12 sends the transmission policy $M_1$ to the first electronic device 10. The first electronic device 10 transmits the to-be-transmitted data to the second electronic device 11 by using the transmission policy $M_1$. The first electronic device 10 may collect statistics on an average transmission speed of transmitting the to-be-transmitted data by using the transmission policy $M_1$, and feed back the average transmission speed to the query end 12 after completing transmission of the to-be-transmitted data, the query end 12 updates the average transmission speed of the transmission policy $M_1$ by using the received average transmission speed.

26: If search result information indicating that matching of the policy search request is null is received from the query end 12, transmit the to-be-transmitted data by using the default transmission policy.

It may be understood that step 24 and step 26 are steps that are performed in parallel. When step 23 is performed, step 24 and step 25 may be selected to be performed, or step 26 may be directly performed.

In some embodiments, when the query end 12 fails to obtain, through searching from the preset policy library, the transmission policy that matches the policy search request, it indicates that no transmission policy that matches the policy search request exists in the preset policy library, and the query end 12 may send, to the first electronic device 10, search result information indicating that matching of the policy search request is null. Because the transmission policy cannot be obtained from the preset policy library, to implement transmission of the to-be-transmitted data, the first electronic device 10 transmits the to-be-transmitted data by using the default transmission policy.

For example, the to-be-transmitted data includes data of the first transmission echelon and data of the second transmission echelon, and the default transmission policy is that the data of the first transmission echelon is first sent, and then the data of the second transmission echelon is sent. For the first transmission echelon, transmission may be sequentially performed in a descending order based on a data volume of each data category in the first transmission echelon. For the second transmission echelon, transmission may be sequentially performed in a descending order based on a data volume of each APP. For example, the to-be-transmitted data includes data of the second transmission echelon and data of the third transmission echelon, and the default transmission policy is that the data of the second transmission echelon is first sent, and then the data of the third transmission echelon is sent. For the third transmission echelon, transmission may be sequentially performed in a descending order based on a data volume of each data category in the third transmission echelon. For example, the to-be-transmitted data includes data of the first transmission echelon, the second transmission echelon, and the third transmission echelon, and the default transmission policy is that the data of the first transmission echelon is first sent, then the data of the second transmission echelon is sent, and the data of the third transmission echelon is finally sent.

In the foregoing data transmission method, whether a transmission policy needs to be obtained from a query end may be determined based on a quantity of transmission echelons to which to-be-transmitted data belongs, so that transmission policy selecting is more flexible. When the transmission policy is obtained from the query end, data is transmitted by using the obtained transmission policy, thereby improving data transmission efficiency. When no transmission policy is obtained from the query end, data is transmitted by using a default transmission policy, thereby ensuring that data migration can be successfully completed.

Figure 3:
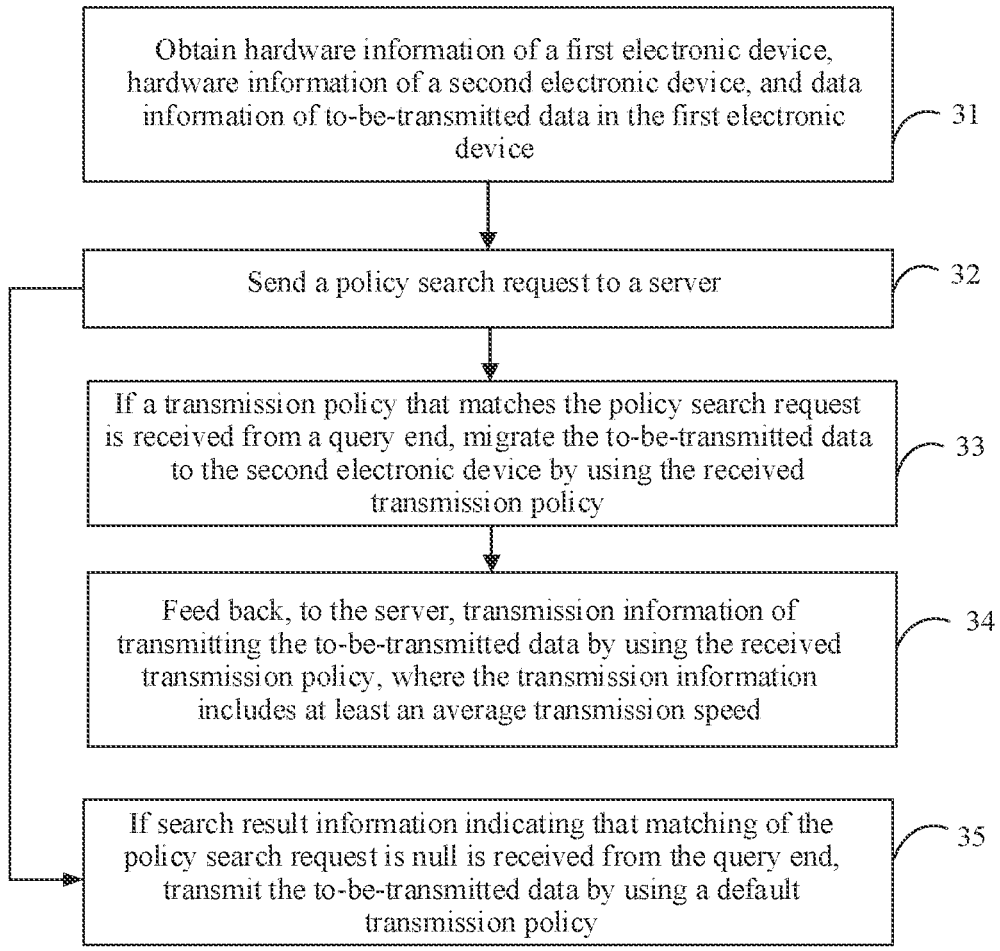
FIG. 3 is a schematic flowchart of a data transmission method according to another embodiment of this application.

Refer to FIG. 3. A data transmission method provided in an embodiment of this application is applied to a first electronic device 10. In this embodiment, an example in which a query end 12 is disposed on a server is used for description, and the data transmission method includes the following steps.

31: Obtain hardware information of the first electronic device 10, hardware information of a second electronic device 11, and data information of to-be-transmitted data in the first electronic device 10.

In some embodiments, when the first electronic device 10 and the second electronic device 11 meet a transmission condition, the first electronic device 10 may obtain the hardware information of the first electronic device 10, the hardware information of the second electronic device 11, and the data information of the to-be-transmitted data. The hardware information of the first electronic device 10 may include parameters such as a device model, a CPU model, a memory size, and a storage capacity. The hardware information of the second electronic device 1I may also include parameters such as a device model, a CPU model, a memory size, and a storage capacity. The data information of the to-be-transmitted data may include information such as a data category of the to-be-transmitted data, a total data volume of the to-be-transmitted data, and a data volume of each data category.

32: Send a policy search request to the server.

In some embodiments, the policy search request includes the hardware information of the first electronic device 10, the hardware information of the second electronic device 11, and the data information of to-be-transmitted data. The data information of the to-be-transmitted data may include the total data volume of the to-be-transmitted data, the data category included in the to-be-transmitted data, and the data volume of each data category. A preset policy library is stored on the server, and the query end 12 disposed on the server may respond to the policy search request, and search the preset policy library for a transmission policy that matches the policy search request.

33: If the transmission policy that matches the policy search request is received from the query end 12, migrate the to-be-transmitted data to the second electronic device 11 by using the received transmission policy.

34: Feed back, to the server, transmission information of transmitting the to-be-transmitted data by using the received transmission policy, where the transmission information includes at least an average transmission speed.

35: If search result information indicating that matching of the policy search request is null is received from the query end 12, transmit the to-be-transmitted data by using a default transmission policy.

It may be understood that step 33 and step 35 are steps that are performed in parallel. When step 32 is performed, step 33 and step 34 may be selected to be performed, or step 35 may be directly performed.

According to the foregoing data transmission method, a transmission policy is obtained from the server based on hardware information of a transmitting end, hardware information of a receiving end, and data information of to-be-transmitted data in the transmitting end, to improve data transmission efficiency. When no transmission policy is obtained from the server, data is transmitted by using the default transmission policy, thereby ensuring that data migration can be successfully completed.

Figure 4:
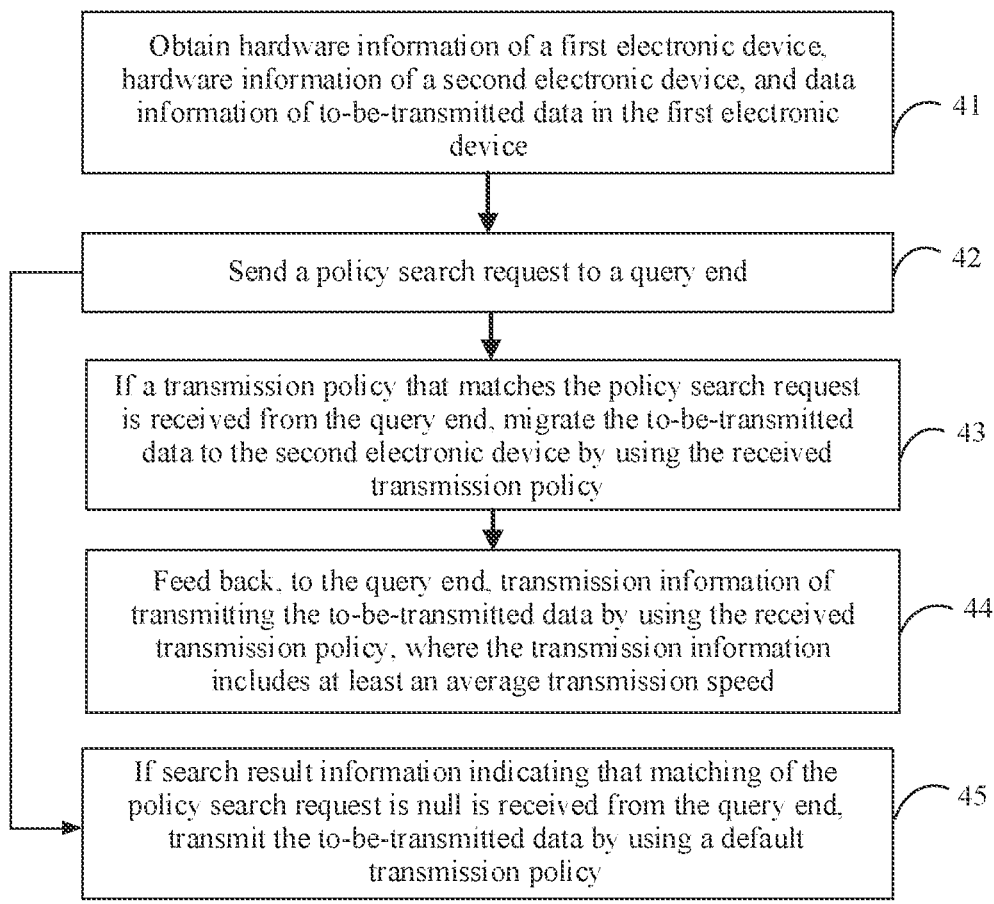
FIG. 4 is a schematic flowchart of a data transmission method according to still another embodiment of this application.

Refer to FIG. 4. A data transmission method provided in an embodiment of this application is applied to a first electronic device 10. In this embodiment, an example in which a preset policy library is stored on the first electronic device 10 is used for description. The data transmission method includes the following steps.

41: Obtain hardware information of the first electronic device 10, hardware information of a second electronic device 11, and data information of to-be-transmitted data in the first electronic device 10.

In some embodiments, when the first electronic device 10 and the second electronic device 11 meet a transmission condition, the first electronic device 10 may obtain the hardware information of the first electronic device 10, the hardware information of the second electronic device 11, and the data information of the to-be-transmitted data. The hardware information of the first electronic device 10 may include parameters such as a device model, a CPU model, a memory size, and a storage capacity. The hardware information of the second electronic device 11 may also include parameters such as a device model, a CPU model, a memory size, and a storage capacity. The data information of the to-be-transmitted data may include information such as a data category of the to-be-transmitted data, a total data volume of the to-be-transmitted data, and a data volume of each data category.

42: Send a policy search request to a query end 12.

In some embodiments, the policy search request includes the hardware information of the first electronic device 10, the hardware information of the second electronic device 11, and the data information of to-be-transmitted data. The data information of the to-be-transmitted data may include the total data volume of the to-be-transmitted data, the data category included in the to-be-transmitted data, and the data volume of each data category. The query end 12 may respond to the policy search request and search the preset policy library for a transmission policy that matches the policy search request.

43: If the transmission policy that matches the policy search request is received from the query end 12, migrate the to-be-transmitted data to the second electronic device 11 by using the received transmission policy.

44: Feed back, to the query end 12, transmission information of transmitting the to-be-transmitted data by using the received transmission policy, where the transmission information includes at least an average transmission speed.

45: If search result information indicating that matching of the policy search request is null is received from the query end 12, transmit the to-be-transmitted data by using a default transmission policy.

It may be understood that step 43 and step 45 are steps that are performed in parallel. When step 42 is performed, step 43 and step 44 may be selected to be performed, or step 45 may be directly performed.

According to the foregoing data transmission method, a transmission policy is searched from a local policy library of a first electronic device based on hardware information of a transmitting end, hardware information of a receiving end, and data information of to-be-transmitted data in the transmitting end, to improve data transmission efficiency. When no transmission policy is not obtained through searching from the local policy library, data is transmitted by using a default transmission policy, thereby ensuring that data migration can be successfully completed.

Figure 5:
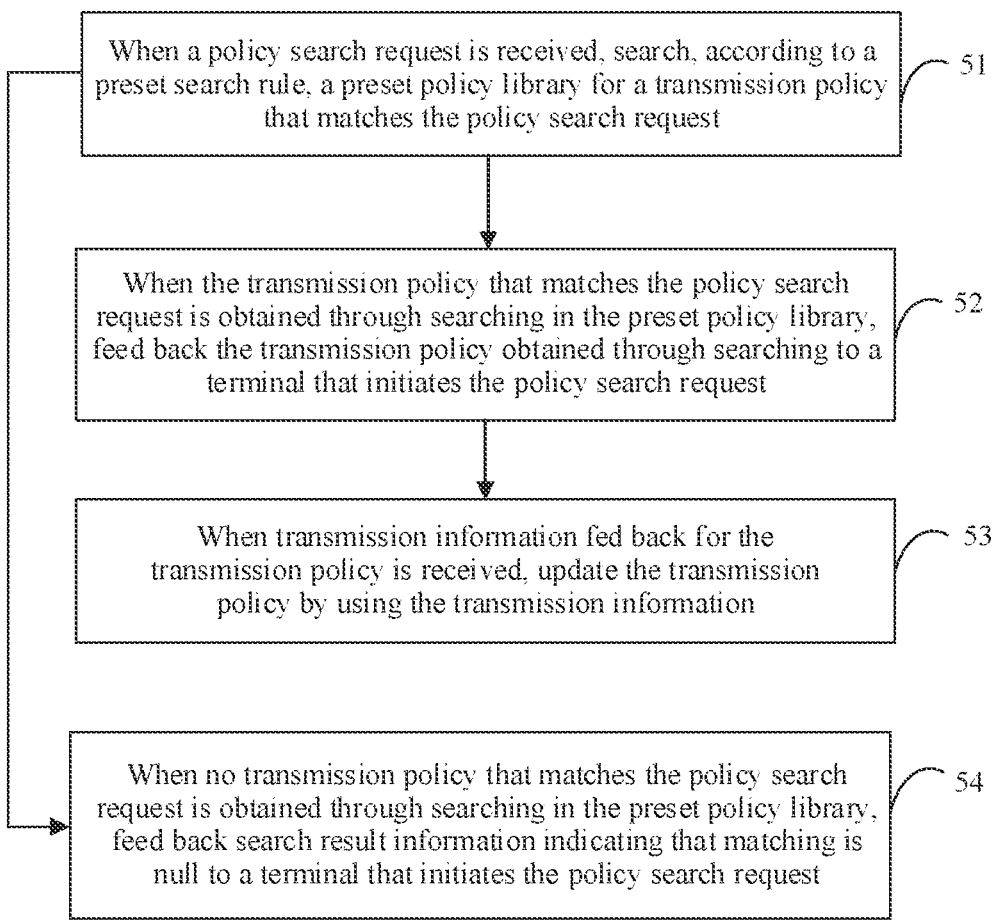
FIG. 5 is a schematic flowchart of a data transmission method according to still another embodiment of this application.

Refer to FIG. 5. A data transmission method provided in an embodiment of this application is applied to a query end 12. In this embodiment, the data transmission method includes the following steps.

51. When a policy search request is received, search, according to a preset search rule, a preset policy library for a transmission policy that matches the policy search request.

In some embodiments, when receiving the policy search request, the query end 12 attempts, according to the preset search rule, to search the preset policy library for the transmission policy that matches the policy search request.

52: When the transmission policy that matches the policy search request is obtained through searching in the preset policy library, feed back the transmission policy obtained through searching to a terminal that initiates the policy search request.

In some embodiments, for example, a first electronic device 10 sends the policy search request. When the query end 12 obtains, through searching in the preset policy library, the transmission policy that matches the policy search request, the query end 12 feeds back the transmission policy obtained through searching to the first electronic device 10.

53: When transmission information fed back for the transmission policy is received, update the transmission policy by using the transmission information.

In some embodiments, when the terminal that initiates the policy search request performs data transmission by using the received transmission policy, the terminal may collect statistics on the transmission information in a data transmission process, and feed back the transmission information to the query end 12. The transmission information includes at least an average transmission speed. The query end 12 may update the transmission policy based on the transmission information.

54: When no transmission policy that matches the policy search request is obtained through searching in the preset policy library, feed back search result information indicating that matching is null to a terminal that initiates the policy search request.

It may be understood that step 52 and step 54 are steps that are performed in parallel. When step 51 is performed, step 52 and step 53 may be selected to be performed, or step 54 may be directly performed.

In some embodiments, for example, the first electronic device 10 sends the policy search request. When the query end 12 fails to obtain, through searching in the preset policy library, the transmission policy that matches the policy search request, the query end 12 feeds back the search result information indicating that matching is null to the first electronic device 10.

Figure 6:
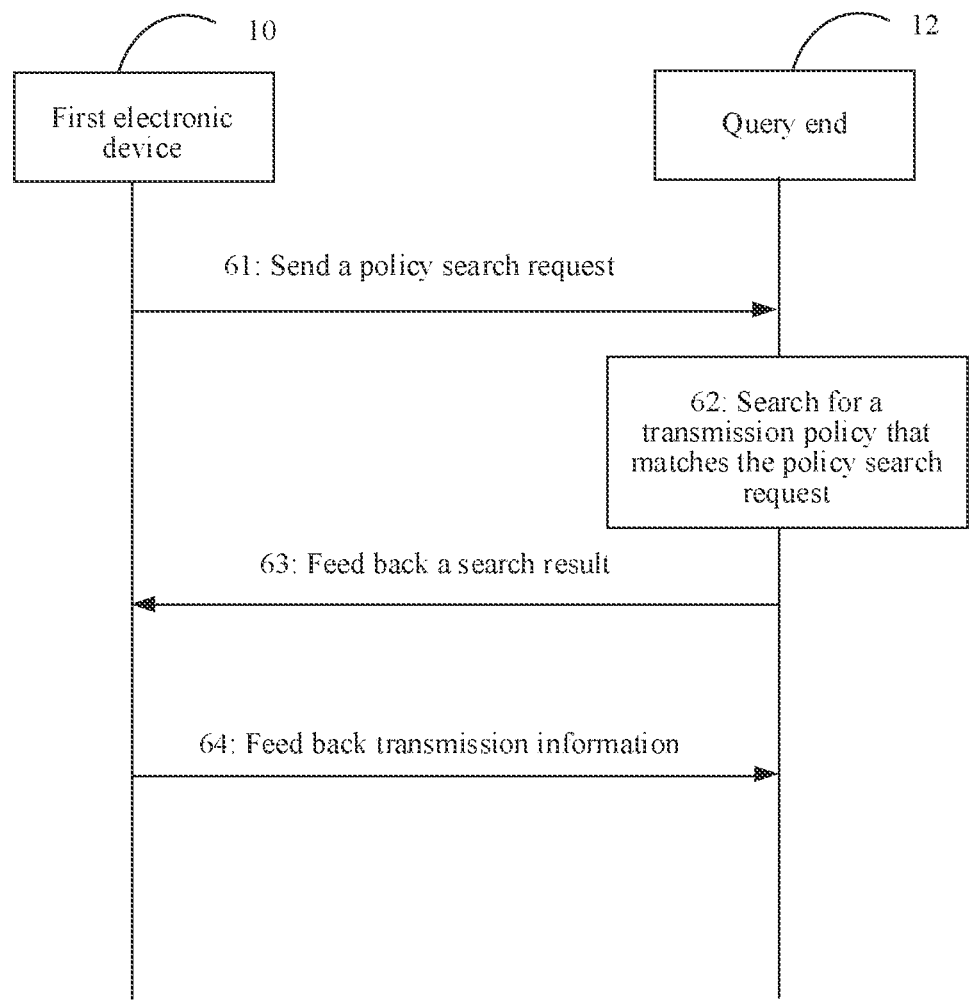
FIG. 6 is a schematic diagram of interaction of data interaction between a first electronic device and a query end according to an embodiment of this application.

The following describes, with reference to FIG. 6, an example of a schematic diagram of data interaction between a first electronic device 10 and a query end 12 according to an embodiment of this application.

61: The first electronic device 10 sends a policy search request to the query end 12.

In some embodiments, the policy search request includes hardware information of the first electronic device 10, hardware information of the second electronic device 11, a total data volume of the to-be-transmitted data, the data category included in the to-be-transmitted data, and a data volume of each data category. For example, the hardware information of the first electronic device 10 is defined as an impact factor $f_1$, the hardware information of the second electronic device 11 is defined as an impact factor $f_2$, the data category included in the to-be-transmitted data is defined as an impact factor $f_3$, the total data volume of the to-be-transmitted data is defined as an impact factor $f_4$, APP data in the to-be-transmitted data is defined as an impact factor $f_5$, video data in the to-be-transmitted data is defined as an impact factor $f_6$, and picture data in the to-be-transmitted data is defined as an impact factor $f_7$, music data in the to-be-transmitted data is defined as an impact factor $f_8$, document data in the to-be-transmitted data is defined as an impact factor $f_9$, recording data in the to-be-transmitted data is defined as an impact factor $f_{10}$, SMS data in the to-be-transmitted data is defined as an impact factor $f_{11}$, contact data in the to-be-transmitted data is defined as an impact factor $f_{12}$, call record data in the to-be-transmitted data is defined as an impact factor $f_{13}$, memo data in the to-be-transmitted data is defined as an impact factor $f_{14}$, and system setting data in the to-be-transmitted data is defined as an impact factor $f_{15}$.

62: The query end 12 searches, according to a preset search rule, a preset policy library for a transmission policy that matches the policy search request.

In some embodiments, the preset policy library includes a plurality of transmission policies, each transmission policy may be represented in a queue style, and a sequence of elements in the queue is a sending sequence of data categories. For example, in a transmission policy $M_1 = \{n_1, n_2, n_3, \ldots, n_i\}$, $n_1$ represents an $i^{th}$ sent data category.

In some embodiments, when receiving the policy search request, the query end 12 performs transmission policy that matches in the preset policy library according to the following search rule:

i: Select a transmission policy that matches both the impact factor $f_i$ and the impact factor $f_2$ from the preset policy library. The transmission policy that matches the impact factor $f_1$ may refer to a transmission policy that has a same device model, a same memory size, and a same storage capacity as those of the first electronic device 10, or a transmission policy that has a same CPU model, a same memory size, and a same storage capacity as those of the first electronic device 10.

The transmission policy that matches the impact factor $f_2$ may refer to a transmission policy that has a same device model, a same memory size, and a same storage capacity as those of the second electronic device 11, or a transmission policy that has a same CPU model, a same memory size, and a same storage capacity as those of the second electronic device 11. If a plurality of transmission policies that match the impact factor $f_1$ and the impact factor $f_2$ are selected from the preset policy library, matching in step ii continues. If only one transmission policy that matches the influencing factor $f_i$ and the influencing factor $f_2$ is selected from the preset policy library, the query end 12 determines the transmission policy as the transmission policy that matches the policy search request, and sends the transmission policy to the first electronic device 10. If no transmission policy that matches both the impact factor $f_i$ and the impact factor $f_2$ is found in the preset policy library, the query end 12 feeds back search result information indicating that matching is null to the first electronic device 10, and the first electronic device 10 transmits the to-be-transmitted data by using a default transmission policy.

ii: Select a transmission policy that matches the impact factor $f_3$ from the plurality of transmission policies matched in step i, that is, select the transmission policy of which a data category is the same as that of the current to-be-transmitted data from the plurality of transmission policies matched in step i.

For example, if the data category of the current to-be-transmitted data includes a first data category (SMS data), a second data category (contact data), a fifth data category (picture data), a ninth data category (document data), and a tenth data category (APP data), a transmission policy for transmitting only the first data category, the second data category, the fifth data category, the ninth data category, and the tenth data category is selected from the plurality of transmission policies matched in step i. If a plurality of transmission policies that match the impact factor $f_3$ may still be selected from the plurality of transmission policies matched in step i, matching in step iii continues. If only one transmission policy that matches the influence factor $f_6$ is selected from the plurality of transmission policies matched in step i, the query end 12 determines the transmission policy as the transmission policy that matches the policy search request, and sends the transmission policy to the first electronic device 10. If no transmission policy that matches the impact factor $f_3$ is obtained through searching in the plurality of transmission policies matched in step i, an optimal transmission policy may be selected from the plurality of transmission policies matched in the step i as the transmission policy that matches the policy search request. The optimal transmission policy may be a transmission policy with a maximum transmission speed in the plurality of transmission policies, or a transmission policy of which a data category has a minimum difference with the data category of the current to-be-transmitted data. If there are a plurality of transmission policies with the minimum difference, a transmission policy with a maximum transmission speed may be selected.

In some embodiments, if no transmission policy that matches the impact factor $f_3$ is obtained through searching in the plurality of transmission policies matched in step it the query end 12 may also feed back search result information indicating that matching is null to the first electronic device 10, and the first electronic device 10 transmits the to-be-transmitted data by using the default transmission policy.

iii: Select a transmission policy that matches the impact factor $f_4$ from the plurality of transmission policies matched in step ii, that is, select a transmission policy of which a total data volume and the total data volume of the current to-be-transmitted data have a difference within a preset range from the plurality of transmission policies matched in step ii.

The preset range may be set based on an actual requirement. For example, the preset range is set from −3 GB to +3 GB, and a transmission policy of which the total data volume and the total data volume of the current to-be-transmitted data have a difference within 3 GB is selected from the plurality of transmission policies matched in step ii. If a plurality of transmission policies that match the impact factor $f_4$ may still be selected from the plurality of transmission policies matched in the step ii, matching in step iv continues. If only one transmission policy that matches the influence factor $f_4$ is selected from the plurality of transmission policies matched in step ii, the query end 12 determines the transmission policy as the transmission policy that matches the policy search request, and sends the transmission policy to the first electronic device 10. If no transmission policy that matches the impact factor $f_4$ is obtained through searching in the plurality of transmission policies matched in step ii, an optimal transmission policy may be selected from the plurality of transmission policies matched in the step ii as the transmission policy that matches the policy search request. The optimal transmission policy may be a transmission policy with a maximum transmission rate in the plurality of transmission policies, or a transmission policy with a minimum total data volume difference. If there are a plurality of transmission policies with the minimum total data volume difference, a transmission policy with a maximum transmission speed may be selected.

In some embodiments, if no transmission policy that matches the impact factor $f_4$ is obtained through searching in the plurality of transmission policies matched in step ii, the query end 12 may also feed back search result information indicating that matching is null to the first electronic device 10, and the first electronic device 10 transmits the to-be-transmitted data by using the default transmission policy.

In some embodiments, a sequence of determining a data category and a total data volume may be changed. For example, step ii is: Select a transmission policy that matches the influence factor $f_4$ from the plurality of transmission policies matched in step i, that is, select a transmission policy of which a total data volume and the total data volume of the current to-be-transmitted data have a difference within a preset range from the plurality of transmission policies matched in step i. Step iii is: Select a transmission policy that matches the influence factor $f_6$ from the plurality of transmission policies matched in step ii, that is, select the transmission policy of which a data category is the same as that of the current to-be-transmitted data from the plurality of transmission policies matched in step ii.

iv. Select a transmission policy that has a minimum comprehensive difference with the influence factors $f_6$ to $f_{15}$ from the plurality of transmission policies matched in step iii as the transmission policy that matches the policy search request.

The query end 12 may sequentially calculate, based on a preset deviation calculation formula, a comprehensive difference between each transmission policy selected in step iii and the influence factors $f_5$ to $f_{15}$ of the current to-be-transmitted data, and then select a transmission policy that has the minimum comprehensive difference as the transmission policy that matches the policy search request. The preset deviation calculation formula may be $V=\text{Sum}(p_i * |f_i - f_i'|)$, where $5 \leq i \leq 15$, V is the comprehensive difference, $p_i$ is a weight of an impact factor $f_i$, a value of $p_i$ may be set based on an actual requirement, each impact factor $f_1$ may have a different weight value, $f_i$ is an impact factor of the current to-be-transmitted data, and $f_i'$ is an impact factor of a transmission policy selected from step iii, $|f_i - f_i'|$ is an absolute value of a difference between the impact factor $f_i$ and the impact factor $f_i'$.

It may be understood that the foregoing selecting step iv is described by using an example in which the current to-be-transmitted data includes the influence factors $f_5$ to $f_{15}$. The to-be-transmitted data may alternatively include only some of the influence factors $f_5$ to $f_{15}$, for example, include the influence factors $f_5$ to $f_8$. In this case, a transmission policy that has a minimum comprehensive difference with the influence factors $f_5$ to $f_8$ is selected from the plurality of transmission policies matched in step iii as the transmission policy that matches the policy search request.

For example, the transmission policies selected in step iii include a transmission policy $M_1$, a transmission policy $M_2$, and a transmission policy $M_3$. The to-be-transmitted data includes impact factors $f_5$ (an amount of APP data is 800 MB), $f_6$ (an amount of video data is 2 GB, that is, 2048 MB), $f_7$ (an amount of picture data is 900 MB), and $f_8$ (an amount of music data is 800 MB). If the transmission policy $M_1$ includes impact factors $f_5'$ (an amount of APP data is 700 MB), $f_6'$ (an amount of video data is 3 GB, that is, 3072 MB), $f_7'$ (an amount of picture data is 700 MB), and $f_8'$ (an amount of music data is 500 MB), a comprehensive difference between the transmission policy $M_1$ and the current to-be-transmitted data $V1=(p_5*|800-700|)+(p_6*|2048-3072|)+(p_7*|900-700|)+(p_8*|800-500|)$ may be obtained through calculation by using the preset deviation calculation formula. If the transmission policy $M_2$ includes the influence factors $f_5'$ (an amount of APP data is 700 MB), $f_7'$ (an amount of video data is 1.5 GB, that is, 1536 MB), $f_8'$ (an amount of picture data is 700 MB), and $f_8'$ (an amount of music data is 500 MB), a comprehensive difference between the transmission policy $M_2$ and the current to-be-transmitted data $V2=(p_5*|800-700|)+(p_6*|2048-1536|)+(p_7*|900-700|)+(p_8*|800-500|)$ may be obtained through calculation by using the preset deviation calculation formula. If the transmission policy $M_3$ includes the influence factors $f_5'$ (an amount of APP data is 500 MB), $f_6'$ (an amount of video data is 1.5 GB, that is, 1536 MB), $f_7'$ (an amount of picture data is 900 MB), and $f_5'$ (an mount of music data is 700 MB), a comprehensive difference between the transmission policy $M_3$ and the current to-be-transmitted data $V3=(p_5*|800-500|)+(p_6*|2048-1536|)+(p_7*|900-900|)+(p_8*|800-700|)$ may be obtained through calculation by using the preset deviation calculation formula. After the comprehensive differences V1, V2, and V3 are obtained through calculation, a transmission policy with the minimum comprehensive difference is selected as the transmission policy that matches the policy search request. For example, if V1>V2>V3, the query end 12 selects the transmission policy $M_3$ as the transmission policy that matches the policy search request, and sends the transmission policy $M_3$ to the first electronic device 10.

63. The query end 12 feeds back a search result to the first electronic device 10.

In some embodiments, if the query end 12 obtains, through searching in the preset policy library, the transmission policy that matches the policy search request, the query end 12 feeds back the transmission policy obtained through searching to the first electronic device 10. When the query end 12 fails to obtain, through searching in the preset policy library, the transmission policy that matches the policy search request, the query end 12 feeds back the search result information indicating that matching is null to the first electronic device 10. In this case, the first electronic device 10 transmits the to-be-transmitted data by using the default transmission policy.

64: The first electronic device 10 feeds back transmission information to the query end 12.

In some embodiments, the transmission information may include at least an average transmission speed. When transmitting the to-be-transmitted data by using the transmission policy received from the query end 12, the first electronic device 10 may collect statistics on the transmission information in a data transmission process, and feed back the transmission information to the query end 12, so that the query end 12 may update the transmission policy based on the transmission information.

Figure 7:
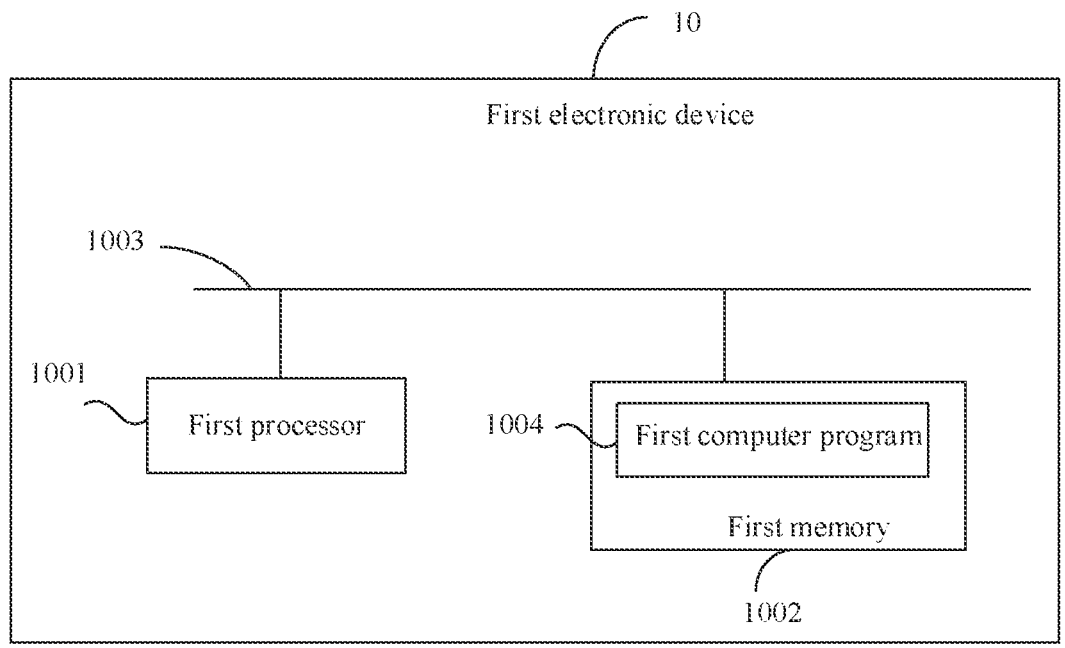
FIG. 7 is a possible schematic diagram of a structure of a first electronic device according to an embodiment of this application.

FIG. 7 is a schematic diagram of a structure of hardware of a first electronic device 10 according to an embodiment of this application. As shown in FIG. 7, a first electronic device 10 may include a first processor 1001, a first memory 1002, and a first communication bus 1003. The first memory 1002 is configured to store one or more first computer programs 1004. The one or more first computer programs 1004 are configured to be executed by the first processor 1001. The one or more first computer programs 1004 include instructions, and the instruction may be used to perform the foregoing data transmission method in the first electronic device 10.

It may be understood that the structure shown in this embodiment does not constitute a specific limitation on the first electronic device 10. In some other embodiments, the first electronic device 10 may include more or fewer components than those shown in the figure, or combine some components, or split some components, or have different component arrangements.

Figure 8:
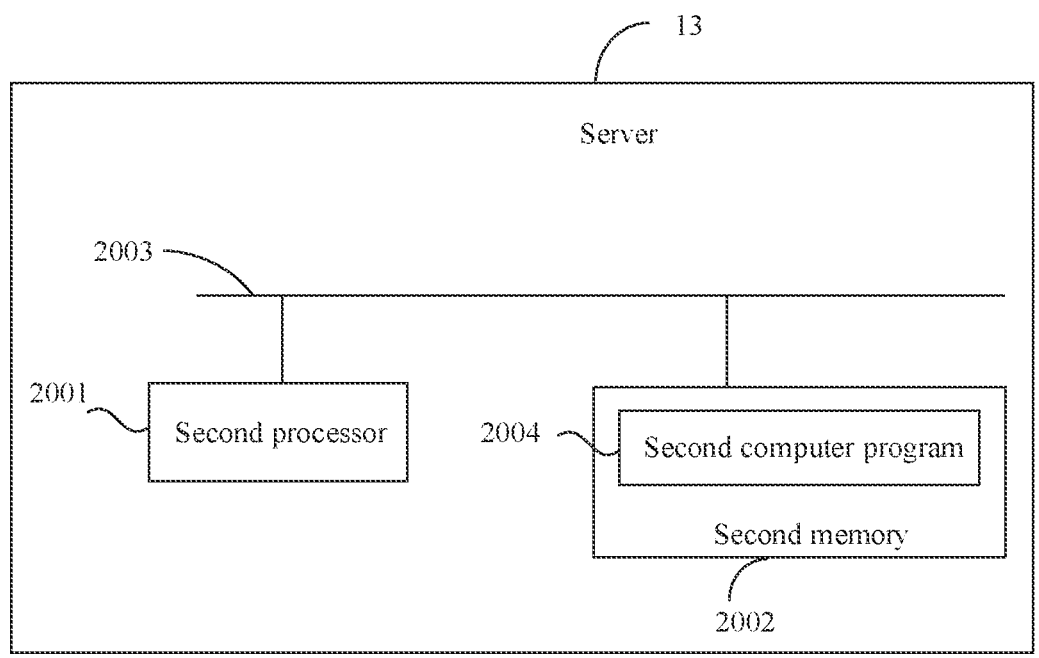
FIG. 8 is a schematic diagram of a structure of a possible server according to an embodiment of this application.

FIG. 8 is a schematic diagram of a hardware structure of a server 13 according to an embodiment of this application. As shown in FIG. 8, the server 13 may include a second processor 2001, a second memory 2002, and a second communication bus 2003. The second memory 2002 is configured to store one or more second computer programs 2004. The one or more second computer programs 2004 are configured to be executed by the second processor 2001. The one or more second computer programs 2004 include instructions, and the instructions may be used to perform the foregoing data transmission method in the server 13.

It may be understood that the structure shown in this embodiment does not constitute a specific limitation on the server 13. In some other embodiments, the server 13 may include more or fewer components than those shown in the figure, or combine some components, or split some components, or have different component arrangements.

Both the first processor 1001 and the second processor 2001 may include one or more processing units. For example, the first processor 1001 may include an application processor (application processor, AP), a modem, a graphics processing unit (graphics processing unit, GPU), an image signal processor (image signal processor, ISP), a controller, a video codec, a digital signal processor (digital signal processor, DSP), a baseband processor, and/or a neural network processor (neural-network processing unit, NPU). Different processing units may be independent components, or may be integrated into one or more processors.

The first processor 1001 and the second processor 2001 may be further provided with a memory, configured to store instructions and data. In some embodiments, memories in the first processor 1001 and the second processor 2001 are caches. The memory may store instructions or data that is just used or cyclically used by the first processor 1001 (the second processor 2001). If the first processor 1001 (the second processor 2001) needs to use the instructions or the data again, the instructions or the data may be directly invoked from the memory. This avoids repeated access and reduces a waiting time of the first processor 1001 (the second processor 2001), thereby improving system efficiency.

In some embodiments, both the first processor 1001 and the second processor 2001 may include one or more interfaces. The interface may include an inter-integrated circuit (inter-integrated circuit, 12C) interface, an integrated circuit built-in audio (inter-integrated circuit sound, 12S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a universal input/output (general-purpose input/output, GPIO) interface, a SIM interface, a USB interface, and/or the like.

In some embodiments, both the first memory 1002 and the second storage area 2002 may include a high-speed random access memory, and may further include a non-volatile memory, for example, a hard disk, a memory, a plug-in hard disk, a smart memory card (Smart Media Card, SMC), a secure digital (Secure Digital, SD) card, a flash memory card (Flash Card), at least one magnetic disk storage device, a flash memory component, or another volatile solid-state storage component.

This embodiment further provides a computer storage medium. The computer storage medium stores computer instructions. When the computer instruction are run on an electronic device, the electronic device performs the foregoing related method steps to implement the data transmission method in the foregoing embodiments.

This embodiment further provides a computer program product. When the computer program product runs on a computer, the computer performs the foregoing related steps, to implement the data transmission method in the foregoing embodiments.

In addition, this embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, so that the chip performs the data transmission method in the foregoing method embodiments.

The first electronic device, the computer storage medium, the computer program product, or the chip provided in this embodiment is configured to perform a corresponding method provided above. Therefore, for beneficial effects that can be achieved by the first electronic device, the computer storage medium, the computer program product, or the chip, refer to beneficial effects of the corresponding method provided above. Details are not described herein again.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is only logical function division, and may be other division in an actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on different places. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium Based on such an understanding, the technical solutions of embodiments of this application essentially, or the part contributing to the conventional technology, or all or some of the technical solutions may be implemented in a form of a software product. The software product is stored in a storage medium, and includes several instructions for instructing a device (which may be a single-chip microcomputer, a chip, or the like) or a processor (processor) to perform all or some of the steps of the methods in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of this application, but are not intended to limit the protection scope of this application. Any variation or replacement made within the technical scope disclosed in this application shall fall within the protection scope of this application.

What is claimed is:

1. An apparatus, comprising:
   a memory configured to store instructions; and
   one or more processors coupled to the memory and configured to execute the instructions to:
      receive a policy query request, wherein the policy query request comprises first hardware information of a transmitting end, second hardware information of a receiving end, and data information of to-be-transmitted data in the transmitting end, and wherein the data information comprises a first total data volume of the to-be-transmitted data, one or more first data categories comprised in the to-be-transmitted data, and a first data volume of each of the one or more first data categories;
      search, in response to receiving the policy query request, a preset policy library for a first transmission policy that matches the policy query request to obtain a query result; and
      feed back, to the transmitting end, the query result.

2. The apparatus of claim 1, wherein the one or more processors are further configured to execute the instructions to:
   feed back, to the transmitting end, the first transmission policy as the query result when the first transmission policy is obtained through searching the preset policy library; and
   feed back, to the transmitting end, search result information indicating that matching is null as the query result when the first transmission policy is not obtained through searching the preset policy library.

3. The apparatus of claim 1, wherein the one or more processors are further configured to execute the instructions to:
receive, in response to feeding back the query result, transmission information; and
update, by using the transmission information, the first transmission policy, and
wherein the transmission information comprises an average transmission speed.

4. The apparatus of claim 1, wherein the one or more processors are further configured to execute the instructions to:
search the preset policy library for one or more second transmission policies that match the first hardware information and the second hardware information;
search, when a first plurality of the second transmission policies matches the first hardware information and the second hardware information, the first plurality of the second transmission policies for one or more third transmission policies of which a second data category is the same as one of the one or more first data categories; and
search, when a second plurality of the third transmission polices has the second data category that is the same as the one of the one or more first data categories, the second plurality of the third transmission policies for one or more fourth transmission polices of which a second total data volume is within a preset difference range of the first total data volume.

5. The apparatus of claim 4, wherein the one or more processors are further configured to execute the instructions to select, when a third plurality of the fourth transmission policies of which the second total data volume is within the preset difference range, a fifth transmission policy from the third plurality of the fourth transmission policies of which each second data category has a minimum comprehensive difference with each of the one or more first data categories.

6. The apparatus of claim 5, wherein the one or more first data categories comprises i data categories, wherein i is a natural number greater than or equal to 1, wherein before selecting the fifth transmission policy, the one or more processors are further configured to execute the instructions to sequentially calculate, based on a preset deviation calculation formula, a comprehensive difference between each second data category and each of the one or more first data categories, wherein the preset deviation calculation formula is $V=\mathrm{Sum}(p_i * |f_i - f_i'|)$, wherein V is the comprehensive difference, wherein $p_i$ is a weight of an $i^{th}$ data category, wherein $f_i$ is a first data volume of the $i^{th}$ data category of the to-be-transmitted data, wherein $f_i'$ is a second data volume of the $i^{th}$ data category corresponding to the fifth transmission policy, and wherein $|f_i - f_i'|$ is an absolute value of a difference between the $f_i$ and the $f_i'$.

7. The apparatus of claim 4, wherein the one or more processors are further configured to execute the instructions to feed back, to the transmitting end, search result information indicating that matching is null as the query result when none of the one or more second transmission policies matches the first hardware information and the second hardware information.

8. The apparatus of claim 4, wherein the one or more processors are further configured to execute the instructions to:
search the preset policy library for the one or more second transmission policies that has a same device model, a same memory size, and a same storage capacity as the transmitting end and the receiving end; or
search the preset policy library for the one or more second transmission polices that has a same central processing unit (CPU) model, the same memory size, and the same storage capacity as the transmitting end and the receiving end.

9. The apparatus of claim 4, wherein the one or more processors are further configured to execute the instructions to:
use, when the one or more second transmission policies comprises one second transmission policy, the one second transmission policy as the first transmission policy; or
use, when the one or more third transmission policies comprises one third transmission policy, the one third transmission policy as the first transmission policy.

10. The apparatus of claim 4, wherein the one or more processors are further configured to execute the instructions to:
select, when none of the one or more third transmission policies has the second data category that is the same as the one or more first data categories, a fifth transmission policy with a maximum average transmission speed from the first plurality of second transmission policies as the first transmission policy; or
select, when none of the one or more fourth transmission policies has the second total data volume that is within the preset difference range of the first total data volume, a sixth transmission policy with a third total data volume that has a minimum difference from the first total data volume from the second plurality of third transmission polices as the first transmission policy.

11. The apparatus of claim 1, wherein the one or more processors are further configured to execute the instructions to:
search the preset policy library for one or more second transmission policies that match the first hardware information and the second hardware information;
search, when a first plurality of the second transmission policies matches the first hardware information and the second hardware information, the first plurality of the second transmission policies for one or more third transmission policies of which a second total data volume is within a preset difference range of the first total data volume; and
search, when a second plurality of the third transmission polices is within the preset difference range of the first total data volume, the second plurality of third transmission policies for one or more fourth transmission policies of which a second data category is the same as one or more of the first data categories.

12. The apparatus of claim 11, wherein the one or more processors are further configured to execute the instructions to:
select, when none of the one or more third transmission policies has the second total data volume that is within the preset difference range of the first total data volume, a fifth transmission policy with a third total data volume that has a minimum difference from the first total data volume from the first plurality of second transmission policies as the first transmission policy; or
select, when none of the one or more fourth transmission polices has the second data category that is the same as the one or more first data categories, a sixth transmission policy with a maximum average transmission speed from the second plurality of third transmission policies as the first transmission policy.

13. An apparatus, comprising:
a memory configured to store instructions; and
one or more processors coupled to the memory and configured to execute the instructions to:
  obtain, when a transmitting end and a receiving end meet a transmission condition, first hardware information of the transmitting end, second hardware information of the receiving end, and data information of to-be-transmitted data in the transmitting end, wherein the data information comprises a total data volume of the to-be-transmitted data, one or more first data categories comprised in the to-be-transmitted data, and a first data volume of each of the one or more first data categories;
  send, to a query end disposed in the transmitting end or a server, a policy search request, wherein the policy search request comprises the first hardware information, the second hardware information, and the data information;
  receive, from the query end, a query result for the policy search request; and
  obtain, based on the query result, a transmission manner of the to-be-transmitted data.

14. The apparatus of claim 13, wherein the one or more processors are further configured to execute the instructions to:
  transmit, using a transmission policy, the to-be-transmitted data when the query result indicates that the query end finds the transmission policy matching the policy search request; or
  transmit, using a default transmission policy, the to-be-transmitted data when the query result indicates that the query end matching is null.

15. The apparatus of claim 14, wherein the one or more processors are further configured to execute the instructions to feed back, to the query end, transmission information of transmitting the to-be-transmitted data by using the transmission policy, and wherein the transmission information comprises at least an average transmission speed.

16. The apparatus of claim 13, wherein the one or more processors are further configured to execute the instructions to:
  perform, according to a preset echelon division rule, transmission echelon division on the one or more first data categories;
  transmit, using a default transmission policy, the to-be-transmitted data when the one or more first data categories are classified into a same transmission echelon; and
  send, to the query end, the policy search request when the one or more first data categories are classified into two or more transmission echelons.

17. The apparatus of claim 16, wherein the preset echelon division rule comprises:
  classifying a second data category that does not need data preparation into a first transmission echelon;
  classifying a third data category for which data preparation is performed in a first manner into a second transmission echelon; and
  classifying a fourth data category for which data preparation is performed in a second manner into a third transmission echelon.

18. The apparatus of claim 17, wherein the default transmission policy comprises:
  performing, based on a sequence of the first transmission echelon, the second transmission echelon, and the third transmission echelon, data transmission sequentially; and
  performing, based on a data volume of each of the second data category, the third data category, and the fourth data category, the data transmission sequentially in a descending order or an ascending order in the first transmission echelon, the second transmission echelon, or the third transmission echelon.

19. A computer program product comprising instructions stored on a non-transitory computer-readable medium that, when executed by one or more processors, cause an apparatus to:
  receive a policy query request, wherein the policy query request comprises first hardware information of a transmitting end, second hardware information of a receiving end, and data information of to-be-transmitted data in the transmitting end, and wherein the data information comprises a first total data volume of the to-be-transmitted data, one or more first data categories comprised in the to-be-transmitted data, and a first data volume of each of the one or more first data categories;
  search, in response to receiving the policy query request, a preset policy library for a first transmission policy that matches the policy query request to obtain a query result; and
  feed back, to the transmitting end, the query result.

20. The computer program product of claim 19, wherein the instructions further cause the one or more processors to:
  feed back, to the transmitting end, the first transmission policy as the query result when the first transmission policy is obtained through searching the preset policy library; and
  feed back, to the transmitting end, search result information indicating that matching is null as the query result when the first transmission policy is not obtained through searching the preset policy library.

* * * * *